United States Patent [19]

Weber

[11] 4,021,297

[45] May 3, 1977

[54] NUCLEAR REACTOR INSTALLATION CONTAINMENT CONSTRUCTION

[75] Inventor: Robert Weber, Erlangen, Germany

[73] Assignee: Siemens Aktiengesellschaft, Munich, Germany

[22] Filed: Nov. 21, 1973

[21] Appl. No.: 418,120

[30] Foreign Application Priority Data

Nov. 30, 1972 Germany .......................... 2258741

[52] U.S. Cl. .................................. 176/30; 176/87
[51] Int. Cl.² ................. G21C 19/00; G21C 19/18
[58] Field of Search ................. 176/30, 31, 32, 87, 176/38

[56] References Cited

UNITED STATES PATENTS

| 3,200,043 | 8/1965 | Franco et al. | 176/30 |
| 3,271,262 | 9/1966 | Hutchinson | 176/30 |
| 3,583,892 | 6/1971 | Isaac | 176/30 |
| 3,713,968 | 1/1973 | Kennedy et al. | 176/37 |
| 3,756,914 | 9/1973 | Whittaker | 176/32 |
| 3,935,062 | 1/1976 | Keller et al. | 176/30 |

FOREIGN PATENTS OR APPLICATIONS

| 866,541 | 4/1961 | United Kingdom | 176/30 |
| 936,028 | 9/1963 | United Kingdom | 176/30 |
| 940,743 | 10/1963 | United Kingdom | 176/30 |
| 862,624 | 3/1961 | United Kingdom | 176/30 |
| 868,021 | 5/1961 | United Kingdom | 176/32 |
| 1,010,180 | 11/1965 | United Kingdom | 176/87 |

Primary Examiner—Samuel W. Engle
Assistant Examiner—Ralph Palo
Attorney, Agent, or Firm—Kenyon & Kenyon Reilly Carr & Chapin

[57] ABSTRACT

A pressurized-water coolant nuclear reactor installation includes a reactor pressure vessel containing fuel elements and enclosed by a substantially spherical steel containment enclosure which is itself enclosed by a concrete secondary enclosure provided to protect the steel enclosure against external accidents. Also, it is necessary to provide a fuel element storage pool having adequate capacity for storing one complete off-site shipment of fuel elements. According to the disclosure, space is formed between the two enclosures which is sufficient to permit the storage pool to be located outside of the steel containment enclosure but inside of the concrete secondary enclosure, both enclosures normally being air-tight. Therefore, the fuel element storage pool does not have to be located inside of the steel containment enclosure, permitting a reduction in its size and, therefore, expense; at the same time the storage pool is fully enclosed in an air-tight manner via the secondary enclosure while avoiding the need for a separate outside building for enclosing the pool.

2 Claims, 5 Drawing Figures

NUCLEAR REACTOR INSTALLATION CONTAINMENT CONSTRUCTION

BACKGROUND OF THE INVENTION

The present invention relates to a pressurized-water coolant nuclear reactor power plant installation of the type having a reactor pressure vessel, in which the fuel elements are located, and enclosed by a steel containment enclosure in the form of a large sphere which is air-tight, and which is itself enclosed by a secondary enclosure in the form of a concrete construction having a hemispherical top and a cylindrical side wall. The reactor core in the vessel includes a relatively large number of these fuel elements which must be replaced as their fuel becomes burned-up.

The elements in the central portion of the core become burned up first, and when this occurs, the pressure vessel's cover is removed, the central core elements are removed and the elements outside of this central core zone are shuffled inwardly and replaced by an off-site shipment of elements, usually comprising about one-third of the total core change.

For the above purpose, such an installation must include a fuel element storage pool where the fuel elements can be stored during the fuel element shuffling procedure, this requiring the pool to have a capacity for the storage of at least one complete off-site shipment of fuel elements. Preferably the storage pool should have a capacity for storing enough fuel elements for a complete charge of the elements in the reactor core, or in other words a full reactor charge of elements. The pool must be kept flooded with water and contain a fuel element rack interspacing the stored fuel elements far enough apart to exceed the critical distance between them. The pool must, of course, be enclosed in an air-tight manner.

Heretofore this fuel element storage pool has been located inside of the spherical steel containment enclosure and the latter has been required to be of a size to enclose not only the reactor vessel, and the other power plant components of the installation, such as the steam generators, coolant pumps and the like, but also the storage pool and its components.

The construction cost of the steel containment vessel is high in all events, it being spherical to provide strength against internal fluid pressure and being necessarily fabricated from steel plates. Anything that can be done to reduce its size, and therefore expense, is very desirable. At the same time, the provision of a separate storage pool building outside of the concrete secondary containment enclosure, which might permit such a size reduction, is undesirable because of the long transport distances between the pressure vessel and the storage pool and the requirement that the pool be enclosed in an air-tight manner, this involving substantial construction costs.

The object of the present invention is to effect a reduction in the necessary size of the steel containment enclosure without requiring the need for such an outside separate building with its described aspects.

SUMMARY OF THE INVENTION

According to the present invention, the above object is attained by arrangement of the fuel element storage pool in a space formed by and between the steel primary containment enclosure and the concrete secondary enclosure with the pool providing for water flooding of the stored elements and connected with the inside of the primary enclosure for the passage of the fuel elements between the reactor core and the storage pool.

Furthermore, the connection or communication required between the pool and core is arranged for the essentially or substantially horizontal passage of the fuel elements, this communication being effected by a fuel element lock through which the elements may be passed endwise. That is to say, the fuel elements are not passed while vertical through the primary enclosure although they need not be completely horizontal, some inclination being practical or even preferable providing the passage is endwise on the part of the fuel elements.

The above avoids the need for the space between the two enclosures and in which the storage pool is positioned, to be excessively large to permit manipulation of the fuel elements. Also, the fuel elements only need to be transported over relatively short distances as they are carried between the core and storage pool.

The concrete secondary enclosure which protects the primary enclosure against external damage, need not be made greatly larger than the primary enclosure, to provide space for a storage pool having the capacity to store an off-site shipment of fuel elements, that is to say, one providing elements for one-third of the core charge. Any necessary increase in the size, and therefore cost, of the concrete secondary enclosure is more than offset by the decrease in the size, and therefore cost, of the steel primary enclosure which can now be made with a reduced size. The concrete secondary enclosure is completely air-tight and provides an air-tight enclosure for the pool. The need for an air-tight pool building is completely avoided. Because of the fuel element lock provided for the primary enclosure there is no need to enter the latter to transport fuel elements between the reactor core and storage pool.

The concrete secondary or outer enclosure is formed by a hemispherical upper portion which extends down to approximately the equator of the steel spherical primary enclosure and from there on down comprises a cylindrical side wall. Therefore, if the fuel element storage pool is located below the level of this equator, it is occupying a constantly enlarging space formed between the lower half of the steel primary enclosure and the secondary enclosure's cylindrical wall. This space may be substantially enlarged by building the concrete secondary enclosure with its vertical axis eccentric in a horizontal direction with respect to the vertical axis of the spherical inner primary enclosure, both enclosures being symmetrical as to their respective axes. This arrangement provides a relatively large space in the offsetting direction of the concrete secondary enclosure without requiring the latter to be excessively large. In this way space can be provided to accommodate a pool having the capacity to store all of the elements required for a complete or full reactor core charge.

The space in which the storage pool is located must have an extent only about equal to the extent of one-half of the length of a fuel element. In other words, the horizontal offset of the axes of the two enclosures need not be more than this extent. This is made possible by arranging the fuel element lock through the steel primary enclosure, at an inclination from the horizontal, so that fuel elements need not be turned a full 90°. The fuel elements may be lifted from the pool vertically, lowered to the fuel lock vertically, rotated to the angularity of the fuel lock and passed endwise to the latter, the reverse operation, of course, occurring when fuel elements are passed from the core to the pool.

With an exactly horizontal fuel element lock the space must equal at least the lengths of the fuel elements.

The need for this offsetting can be minimized by providing the fuel element storage pool with a side wall contour generally conforming more or less to the circular contours of the enclosures. The necessary auxiliary components of the fuel element storage pool may be fitted within the same space, such as the necessary hoisting equipment, elevator arrangements and the like required to carry the fuel elements from ground level up to and from the pool and for manipulating the elements to and from the lock through the steel primary enclosure. Preferably the fuel element lock is made with a capacity for passing two fuel elements at once so that a fuel element can be passed from the storage pool through the lock while a fuel element from the core is exiting through the lock. This can be done by making the lock transversely large enough.

To render the combination of the two enclosures and the fuel element storage pool rigidly interassociated, all may be supported by a common concrete foundation. In this way the three components are integrated together and rigidly prevented from relative displacement.

BRIEF DESCRIPTION OF THE DRAWINGS

Specific embodiments of the present invention are illustrated by the accompanying drawings, in which.

DETAILED DESCRIPTION OF THE INVENTION

Figure 1:
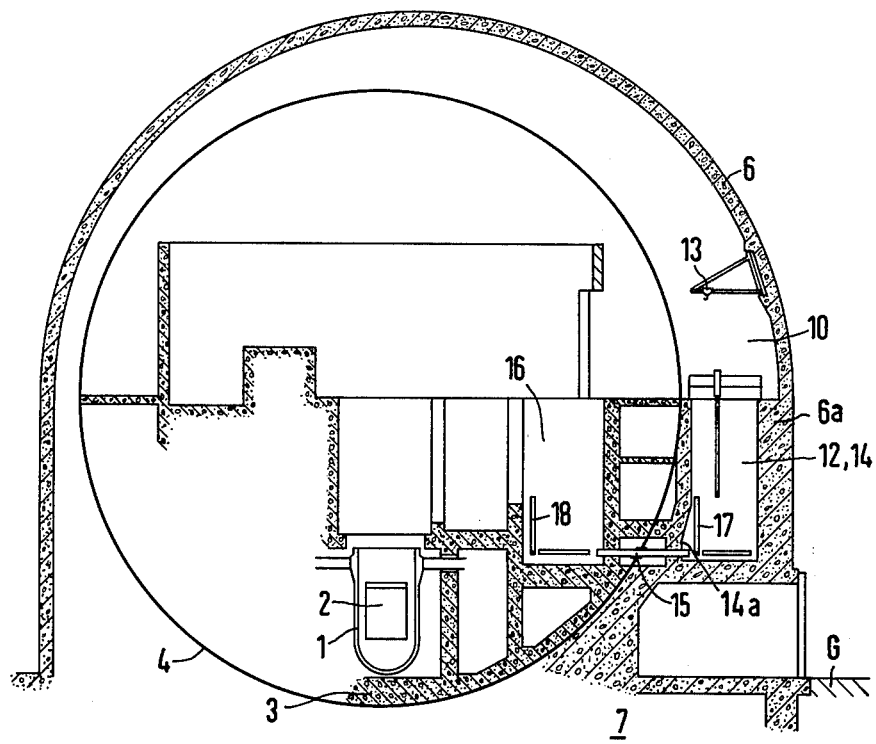
FIG. 1 is a vertical section of a first embodiment.
Figure 2:
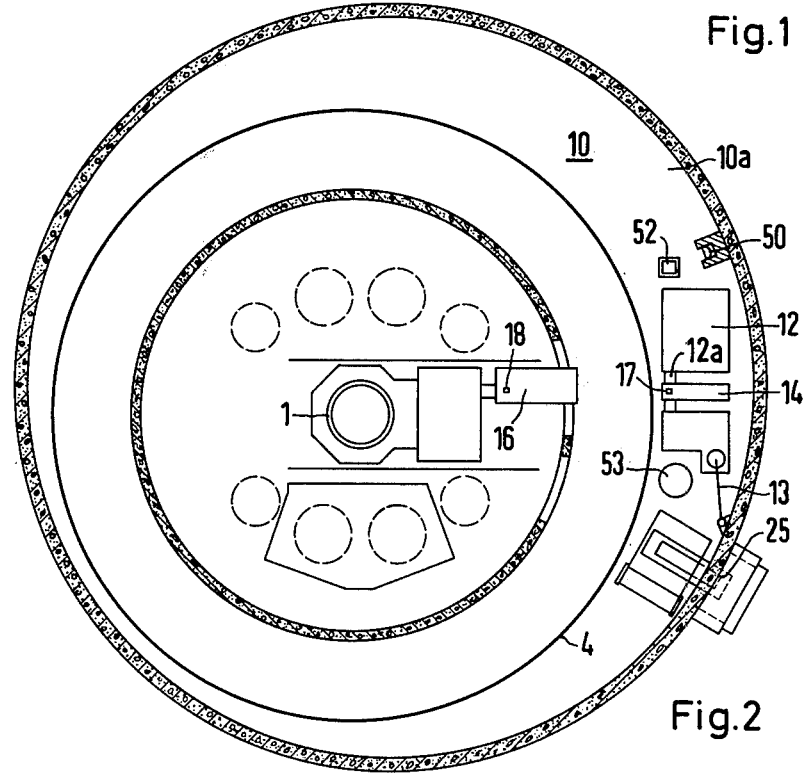
FIG. 2 is a horizontal cross section.

Having reference first to FIGS. 1 and 2, the reactor pressure vessel 1, shown with its cover removed, contains the reactor core 2 where a charge of a large number of vertically arranged fuel elements is located, the pressure vessel 1 and various other reactor components, unnumbered but indicated in FIG. 2 by broken line circles, being supported by concrete constructions 3.

These parts are all enclosed continuously by the spherical steel primary containment enclosure 4 providing air-tightness and containment of fluids, particularly in the event of an accident. To protect this essential steel enclosure 4 against external accidents, such as collision by aircraft out of control, it is itself enclosed by the concrete secondary enclosure 6 having the hemispherical top which ends at about the equator of the enclosure 4 and then continues to extend downwardly in the form of a cylindrical wall 6a surrounding the lower half of the primary enclosure. The steel enclosure 4 throughout its bottom portion is contacted by the concrete construction 3 and a common foundation 7 supports both enclosures 4 and 6 and via the wall of the enclosure 4, the concrete construction 3, whereby these parts are integrally and rigidly unitized against relative displacement.

As to be seen from FIGS. 1 and 2, the concrete enclosure 6 is horizontally offset in the right-hand direction from the steel enclosure 4 as described before, forming a space 10 that is enlarged relative to the space on the opposite side, and it is in this enlarged space 10 that the fuel element storage pool 12 is positioned. This pool is flooded with water and a traveling crane or hoist 13 is supported by the inside wall of the spherical top portion of the concrete enclosure 6 at a location above the pool 12 and other locations where necessary, so it can be used to manipulate fuel elements vertically to and from the pool.

This pool 12, due to the enlarged space 10, can store all of the fuel elements required for a complete core charge, and it connects via a water flooded passageway 12a with a water flooded fuel element lock basin 14 into the bottom of which the horizontal fuel element lock 15 opens, this lock extending through the steel enclosure 4 to the latter's interior where it opens into a water flooded basin 16 provided for fuel element handling and from which by the usual equipment the fuel element may be transported for insertion into or removal from the core 2 of the pressure vessel 1. All of these operations are performed under water as usual and by the usual manipulators.

Fuel element turning devices 17 and 18 in the basins 14 and 16, respectively, serve to rotate the fuel element between vertical to horizontal positions, or 90°, for passage through the fuel element lock 15. The constantly increased space defined between the two enclosures below the equator of the spherical enclosure 4 is used to advantage to provide the bottom of the basin 14 with an enlargement 14a providing increased room for rotation of the fuel elements from their vertical to horizontal positions.

It is to be noted that the pool 12 and the lock 15 are all located below the level of the equator of the spherical enclosure 4 and above ground level indicated at G. There is enough room beside them to form a shop space 10a.

Figures 3, 5:
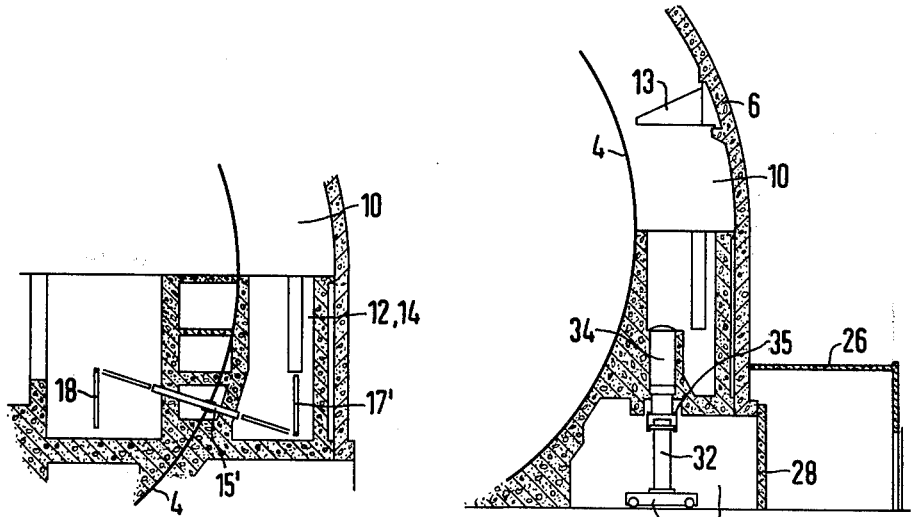
FIG. 3 is a vertical section of a portion of FIG. 1 and illustrates a modification.
FIG. 5 is a vertical section of a portion of FIG. 4.

Referring now to FIG. 3, the fuel element lock 15' is here shown as being upwardly inclined from the bottom of the basin 14. Thus the lock has an angularity better fitting the general geometry of the entire or overall containment construction; its inclination is less than 30° with respect to the horizontal position shown in FIG. 1, and so it too is approximately horizontal. The turning device 17' is in this instance reversely oriented with respect to the arrangement described before, and it is, of course, after vertically receiving a fuel element, not required to turn the fuel element through an entire 90° angularity. However, the lock 15' is substantially or approximately horizontal, particularly as compared to a high vertical lock required for passage of an element vertically and without being turned endwise. As previously indicated, the lock 15 or 15' is preferably made large enough to accommodate two elements at the same time.

As previously indicated, here again the lock and all of its necessary parts are located below the equator of the spherical enclosure 4 and providing the increasingly large space.

The constructions of FIGS. 1 through 3 differ essentially only in the angular relationship of the locks 15 and 15'. In all these cases the concrete outer or secondary containment enclosure 6 has its vertical cylindrical wall 6a provided with an air-tight lock 25 through which materials, such as a shipment of unused fuel elements, may be passed. However, the elements do not have to pass through the steel spherical enclosure 4 excepting via the locks 15 or 15'. Once within the concrete enclosure 6 everything is completely protected against external accidents.

Figure 4:
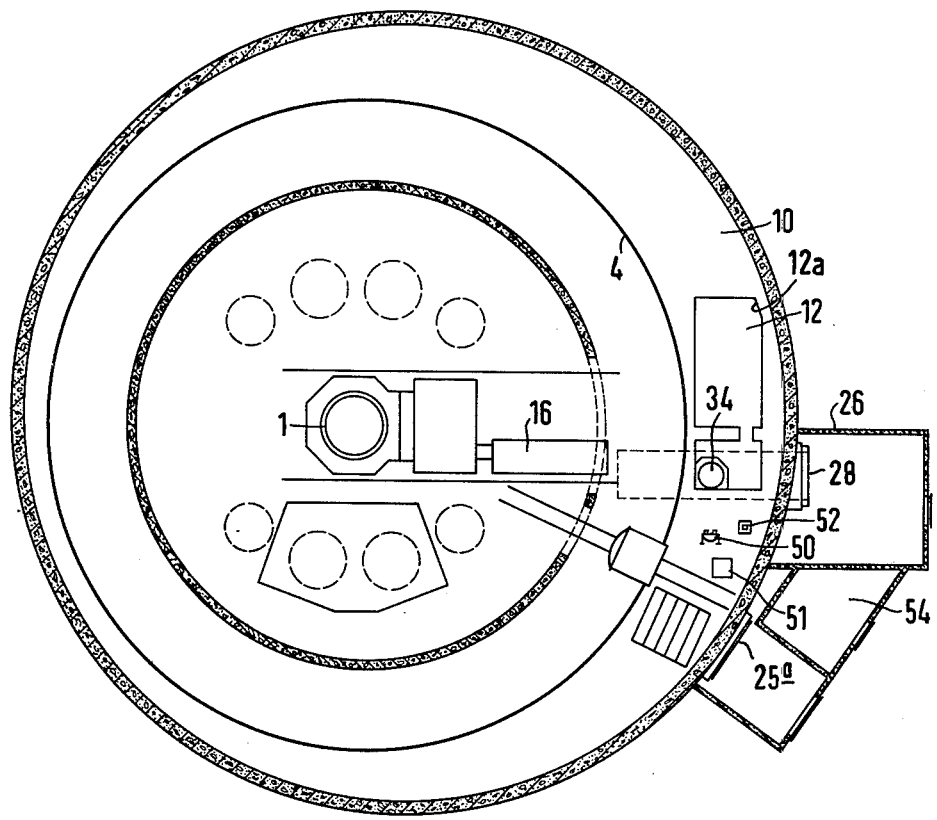
FIG. 4 in horizontal section shows another modification.

Referring now to FIG. 4, in this case the pool 12 is contoured as at 12a to provide it with a larger capacity, and a separate building 26 is provided outside of the protective enclosure 6 but the interior of the concrete enclosure 6 is protected by a heavy crash-proof door 28 inside of which a loading station 30 is located.

FIG. 5 shows how in such a loading station 30 a water-flooded fuel element transport container 32 on a dolly 33 may be rolled in and connected with a vertical lock 34 by means of a water-tight seal 35. The hoist 13 is used for lifting used fuel elements from the pool and lowering them this lock into the transport container, the latter then being unsealed and rolled away on its dolly through the door 28.

New fuel elements are normally delivered in lightweight unshielded containers, such as generally indicated at 50 in FIG. 4. These new unshielded elements may be passed upwardly for handling by the hoist 13 via an elevator hoist shaft shown at 51 in FIG. 4 and 53 in FIG. 2, where in the space 10 they are unloaded and placed in a storage vessel 52 for new elements, or inserted in the storage pool 12. These inside hoist shafts 51 and 53 have the advantage that once passed through the lock 25 or the door 28 as the case may be, the fuel element, and possibly other components may be involved, are continuously protected by the heavy strong concrete outer or secondary enclosure 6. The areas 25 and 30 do not provide any direct path to the steel containment enclosure 4, from the outside. This is likewise true with respect to the vertical fuel element locks such as the one shown at 34 in FIG. 5.

When this new installation is being erected, large components such as the steam generators and the like, can be placed, via openings of adequate size, inside of the steel enclosure 4 after which the concrete is cast around these openings to completely close them off from direct outside possible damage.

After erection of the installation, the fuel elements need to be passed only through the outer concrete enclosure 6 and then moved vertically upwardly, the unshielded new elements being moved upwardly via the elevator arrangements 51 or 53 into the space 10. The used fuel elements are all handled inside of this outer enclosure 6 at all times. Fuel elements requiring protection are handled in the water shielded transport containers 32 via the trolley 33.

FIG. 4 shows how a decontamination ship 54 may be provided next to the building 26 and outside of the secondary shield or enclosure 6. This shop 54 may be provided with a door (not shown) making it accessible without any detour through the outside of the installation, by the intercommunicating doors (25a) normally provided to give access to the inside of the concrete safety or outer enclosure 6.

The hoist 13 may be extended so that fuel elements may be carried to and from the shop space 10a.

What is claimed is:

1. A water-cooled reactor installation comprising a spherical steel air-tight primary containment having a horizontal equator, an internal concrete construction enclosed by said containment and forming a supporting position for a reactor pressure vessel and a fuel-element handling basin horizontally offset from said position with said basin having a top level no higher than said equator, a concrete secondary air-tight containment enclosing said primary containment and having a vertical cylindrical wall extending downwardly from said equator, an external concrete construction below said equator and on the outside of said primary containment and supporting said primary containment and extending to the bottom of said wall and between said containments forming a fuel element storage pool substantially horizontally aligned with said basin and having a top level no higher than said equator, and a fuel-element lock extending transversely through said primary containment and interconnecting said pool and said basin at a level below their said top levels.

2. The installation of claim 1 in which said cylindrical wall is horizontally offset from said primary containment in the same direction said basin is offset from said position and thereby forms an enlarged space between said primary containment and said wall and in which said pool is positioned substantially horizontally aligned with said basin.

* * * * *